United States Patent [19]

Gerich

[11] 4,305,519
[45] Dec. 15, 1981

[54] COLLAPSIBLE HOLDER FOR GROCERY BAGS

[76] Inventor: Gloria Gerich, 3140 Lahser Rd., Bloomfield Hills, Mich. 48013

[21] Appl. No.: 144,726

[22] Filed: Apr. 28, 1980

[51] Int. Cl.³ .......................... B65D 6/18; B65D 6/26
[52] U.S. Cl. .......................................... 220/7; 220/6; 217/15; 217/47; 296/37.7; 224/42.42
[58] Field of Search ............ 220/6, 7, 62, 4 R; 217/15, 47; 229/41 C, 41 D, 18; 296/37.5, 37.7; 224/42.42 R; 43/105

[56] References Cited

U.S. PATENT DOCUMENTS

| | | | |
|---|---|---|---|
| 203,205 | 4/1878 | Smith | 217/47 |
| 872,600 | 12/1907 | Wharton | 217/15 |
| 1,633,425 | 6/1927 | Thixton | 217/47 |
| 2,628,873 | 2/1953 | Bennett | 220/62 |
| 2,832,466 | 4/1958 | Sheard | 229/41 C |
| 3,889,837 | 6/1975 | Wilson | 220/7 |
| 4,029,244 | 6/1977 | Roberts | 220/6 |

*Primary Examiner*—George E. Lowrance
*Attorney, Agent, or Firm*—Cullen, Sloman, Cantor, Grauer, Scott & Rutherford

[57] ABSTRACT

A collapsible holder for grocery bags or the like for use in the trunk or inside a vehicle has a square base. A plurality of upright right angularly related side walls of inverted triangular shape has their base apices hinged to the base corners. The top apices of each side wall at its upper end is removably clipped to the corresponding apex of an adjacent side wall.

10 Claims, 8 Drawing Figures

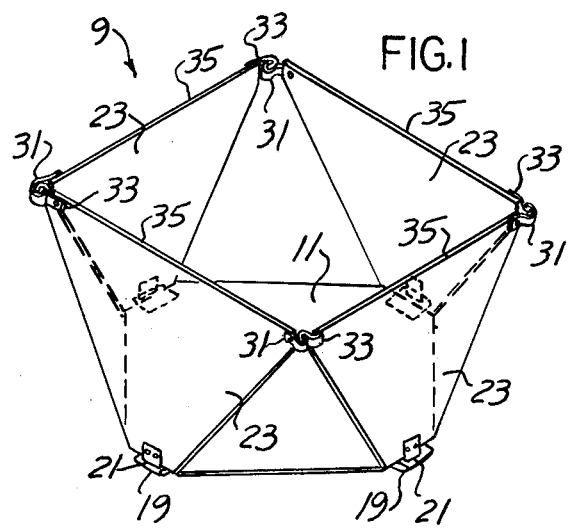
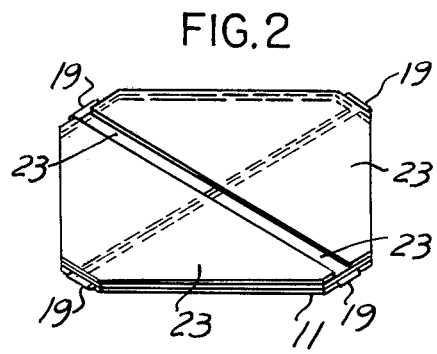
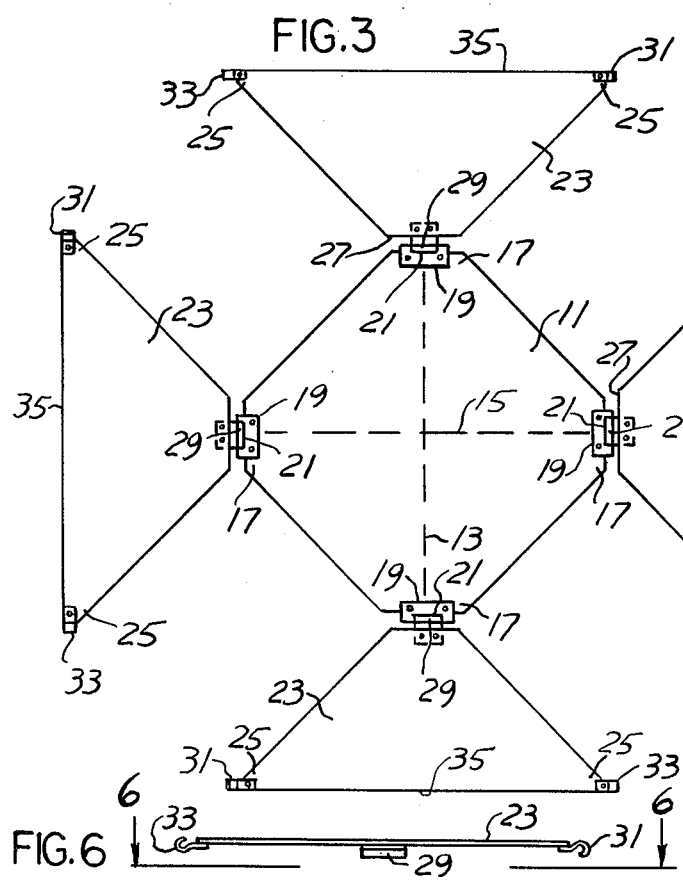
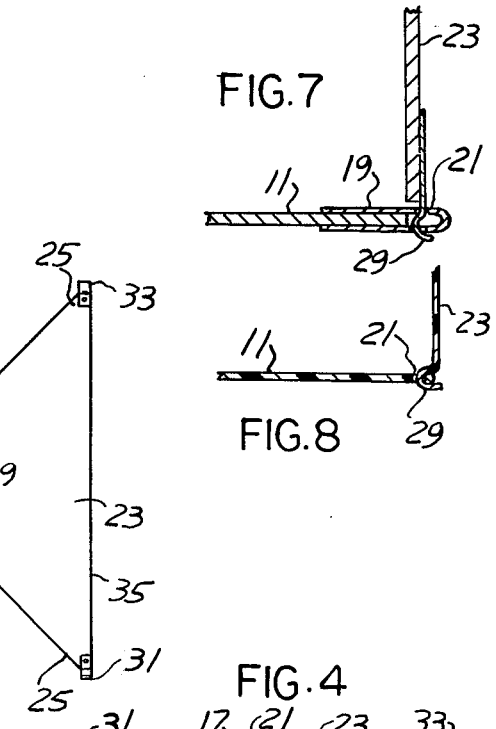

COLLAPSIBLE HOLDER FOR GROCERY BAGS

BACKGROUND OF THE INVENTION

Heretofore there has existed the problem for supporting and retaining a plurality of grocery bags within a vehicle or within the trunk thereof so that the grocery bag and its contents remain upright after it is filled at the grocery store. Very often, absent the present collapsible holder, grocery bags are unstable and are adapted to tip over and spill the contents upon sudden stops or sudden turns. This often results in damage to the grocery items or to their separation from the respective grocery bag.

A search has been conducted in Class 35 of the Patent Office, subclasses 72 and 73; Class 46, subclass 30; Class 40, subclasses 610 and 903; Class 52, digest 10; Class 108, subclasses 11, 115 and 127, Class 248, subclass 174; Class 312, subclass 259.

SUMMARY OF THE INVENTION

An important feature of the present invention is the provision of a collapsible holder for grocery bags or the like for use in the trunk or inside of a vehicle and wherein there is provided a square base of corrugated cardboard or of a plastic material and to the corners of which are hingedly connected a plurality of upright right angularly related side walls of inverted triangular shape, and wherein the base of the respective side walls are hingedly connected to the corners of the base and the top edges of the respective side walls are removably interconnected to provide a free standing upright structure.

Another feature is to form the side walls of a molded plastic material, and wherein the respective hinge elements of the base and side walls are molded as an integral part of the respective base and side walls, and wherein, furthermore, the clip elements at the opposite ends of the top edges of the side walls may be molded as a part of the side walls in a unit construction.

In accordance with the present invention, the respective individual side wall elements each equals substantially one-half the size of the base so that upon successive disengagement of the clipping means at the upper ends of the respective side walls, the respective side walls may be successively hinged downwardly into overlapping and engaging parallel relation with the base for storage when not in use.

A further feature includes a collapsible holder and wherein the collapsible holder may be formed into a free standing enclosure for bags and the like merely by the successive tilting of the respective side walls into a plane at right angles to the base and successively clipping and interlocking the respective corner elements of the respective side walls to the adjacent side wall corner, thus, providing an upstanding structure which may be used within the interior of a vehicle or within the vehicle trunk and adapted to enclose therein up to four grocery bags, retaining them in an upright position.

These and other objects will be seen from the following specification and claims in conjunction with the appended drawing.

THE DRAWING

FIG. 1 is a perspective view of the present collapsible holder for grocery bags ready for use.

FIG. 2 is a perspective view thereof with the side walls collapsed into compact engaging relation and overlying the base.

FIG. 3 is a plan view of the base and side walls with the side walls hinged to the base corners and co-planer, and on an increased scale.

FIG. 4 is a plan view of the collapsible holder of FIG. 1.

FIG. 5 is a side view of one side wall constructed of open lattice work.

FIG. 6 is a plan view taken in the direction of arrows 6—6 of FIG. 5.

FIG. 7 is a fragmentary section on an increased scale taken in the direction of arrows 7—7 of FIG. 4.

FIG. 8 is a similar view of a modification.

It will be understood that the above drawing illustrates merely a preferred embodiment of the invention, and that other embodiments are comtemplated within the scope of the claims hereafter set forth.

DETAILED DESCRIPTION OF ONE EMBODIMENT OF THE INVENTION

The present collapsible holder for grocery bags and the like is generally designated at 9 in FIG. 1 and includes a rectangular base 11 of a suitable material such as cardboard or plastic, which may be PVC, polystyrene, etc. Base 11 is square with diagonal indications applied thereto in dash lines, as shown at 13 and 15 with its respective corners truncated at 17. Said corners extend at an acute included angle of 45 degrees with respect to an adjacent side of the base. At each of the respective corners 17 there is applied a hinge element 19 which can be secured thereto, or, in the illustrative embodiment molded as a part thereof and including an elongated slot 21.

A plurality of symmetrical upright right angularly related side walls 23 of inverted triangular shape are preferably made of a plastic material.

Each side wall, of which there are four, has a top edge 35 and at the ends thereof a pair of apices 25 and the similarly truncated depending corner 27, FIG. 5. Each of the side walls in the preferred embodiment is molded with an arcuate out-turned tongue 29, sometimes referred to as a hinge element adapted for connection with the respective hinge elements 19 of the base. In the illustrative embodiment, the respective tongue 29 projects through the slot 21 of the base hinge element with a type of snap action so as to prevent accidental disconnection. Once assembled, however, the hinge element 29 is movably positioned within one of the corresponding hinge elements 19 of the base.

At opposite ends of each side wall at the apices 25 there is formed upon each side wall an in-turned or reverse-turned clip means or catch 31 and at the opposite end an out-turned clip means or catch 33, which is sufficiently reverse turned and adapted for cooperative interlock with the corresponding catch of the adjacent right angularly related side wall.

This is shown in the plan view, FIG. 4, and wherein at the top edges of the respective side walls at the apices thereof there is provided the in-turned catch 31 and at the opposite end the out-turned catch 33. As shown in FIG. 4, the out-turned catch 33 of one side wall is adapted for cooperative snap interlock with the corresponding in-turned catch 31. The in-turned catch 31 of said side wall is adapted for cooperative snap interlock with the corresponding out-turned catch 33 of the next adjacent side wall going in a clockwise direction.

Though schematically shown in the drawing, the respective catches 31 and 33 are molded as a part of the side wall, or otherwise could be attached thereto and are of such form as to cooperatively snap interlock with the adjacent catch of a right angularly related side wall to complete the assembly of the upstanding collapsible holder, particularly useful for grocery bags.

The present side walls may be plain or may be of a lattice construction, as shown at 37, FIG. 5, for reducing the weight of the collapsible holder and the amount of plastic employed in its construction and at the same time retaining sufficient strength for the intended purpose of storing a series of filled grocery bags, for example, within the open holder when stored in the trunk of a vehicle or upon the interior of a station wagon or the like.

When not in use, the holder may be collapsed to the form shown in FIG. 2. Here the respective side walls are progressively disconnected at their respective ends so that the respective side walls fold downwardly into cooperative parallel engaging relation with the base 11 and with each other.

In the present construction, the side walls are of a size corresponding to one-half the area of the base 11, as shown by the diagonals 13 and 15, FIG. 3, and as shown in the collapsed form in FIG. 2 for easy storage within the vehicle.

FIG. 3 is a plan view showing the base upon a suitable support and wherein the respective side walls are each initially hinged at their truncated corners 27 to the corresponding truncated corner of the base. While the hinge connection between the hinge elements 19 and 29 may be of a permanent nature, it is contemplated in accordance with the present invention that the hinge elements are pre-formed as an integral part of the respective base or side wall so that they snap interlock with each other to retain a flexible characteristic. The same thing is true with respect to the catches 31 and 33, and wherein it is contemplated that there will be a snap interlock between them when assembled so that the holder can be maintained as a free standing object, and be readily collapsible.

Having described my invention, reference should now be had to the following claims.

I claim:

1. A collapsible holder for grocery bags comprising a square base having a series of corners;
    a hinge element at each corner;
    a plurality of symmetrical upright right angularly related side walls of inverted triangular shape;
    each side wall having a top edge and converging sides defining a pair of top apices and a base apex;
    a hinge element at said base apex connected to a corresponding base hinge element respectively;
    and clip means at each of the top apices of the side walls, with the clip means at one end of one side wall interlocked with the corresponding clip means of the next adjacent side wall;
    the side walls at their top edges being co-planer and respectively interlocked at their top corners providing a free standing enclosure.

2. In the collapsible holder of claim 1, the clip means between adjacent top corners of the side walls being successively disengaged so that the side walls will hinge downward successively and overlap each other in parallel engagement and registry with said base.

3. In the collapsible holder of claim 1, the corners of the base and the base apex of each side wall being truncated.

4. In the collapsible holder of claim 1, each side wall being of a size corresponding to one-half of said base.

5. In the collapsible holder of claim 4, the clip means between adjacent top corners of the side walls being successively disengaged so that the side walls will hinge downward successively and overlap each other in parallel engagement and registry with said base.

6. In the collapsible holder of claim 1, the hinge element at each corner of the base having an elongated groove;
    the hinge element on each side wall including an out-turned tongue loosely projected through and interlocked with the respective groove of the corresponding base hinge element.

7. In the collapsible holder of claim 1, said clip means of each side wall including an out-turned clip at one end and an in-turned clip at its other end with the out-turned clip of one side wall interlocked with the in-turned clip of the adjacent side wall so that the corresponding top edges of the respective side walls are successively interlocked with each other respectively throughout 360 degrees.

8. In the collapsible holder of claim 1, the hinge elements of the base and side walls being molded as a part of the base and side walls respectively.

9. In the collapsible holder of claim 8, the clip means of the side walls being molded as a part thereof.

10. In the collapsible holder of claim 1, the side walls being lattice in form and open.

* * * * *